Patented Mar. 29, 1949

2,465,961

UNITED STATES PATENT OFFICE 2,465,961

GREASE

Hendrik van Olphen, Amsterdam, Netherlands, assignor to Shell Development Company, San Francisco, Calif., a corporation of Delaware No Drawing. Application October 8, 1946, Serial No. 702,082. In the Netherlands October 24, 1945

13 Claims. (Cl. 252—40.5)

This invention relates to novel greases and constituents for grease. More particularly it relates to improved greases containing novel stabilizers therefor.

Greases are preferably of uniform consistency, and must remain so over a wide range of temperatures if they are to be satisfactory for general use. However many greases, and especially the lime soap or cup greases, often have one serious disadvantage which may limit their applicability. This disadvantage is their tendency to break down or separate when heated to high temperatures, or when cooled from such high temperatures. This separation results in the loss of most of the oil and in the precipitation of hard gum-like soap-containing masses which have practically no lubricating value and which in fact actually contribute to the failure of the bearing on which the grease is used.

Various substances have been added to grease compositions in an effort to rescue this separation phenonenon to a minimum. These have included alcohols, glycol ethers, fatty acids, partially etherified polyhydric alcohols, partially esterified polyhydric alcohols, and the lower glycols such as ethylene glycol, diethylene glycol, propylene glycols and butylene glycols. However, even if some of these additives have caused a limited improvement in the physical stability of the grease, the improvement is not great enough to be satisfactory, and is of a more or less temporary character, especially in the case of the lower glycols. Due to the low molecular weight of the glycols formerly used they tended to evaporate at elevated temperatures, and, due to their high solubility in water, they were easily washed away if the grease is exposed to the atmosphere or otherwise in contact with moisture.

It is an object of the present invention to provide a grease, especially a lime soap grease, suitable for use over a wide temperature range. Another object of this invention is to provide a grease which will not break down or separate on being subjected to high temperatures and to repeated heating and cooling. A further object is to provide a grease which will not contribute to the failure of bearings in which it is used at temperatures below those at which the grease commences to burn or carbonize. A still further object of this invention is to provide a grease which will not separate to any appreciable extent on cooling from relatively high temperatures, and which will not form hard gum-like soapy masses which normally contribute to bearing failure.

In accordance with the present invention, these and other objects are accomplished by incorporating in a grease a minor proportion of a higher glycol, that is, one having at least six carbon atoms, and preferably having twelve or more carbon atoms per molecule, said glycol having the general formula

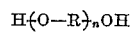

wherein $n$ is an integer, R is a hydrocarbon radical and the factor $n$ times the number of carbons in each R gives 6 or more. The several constituents of the grease will now be discussed.

The soap

The particular type of soap employed will depend upon the characteristics desired. The metallic portion may for example, be sodium, potassium, lithium, calcium, aluminum or barium, or a mixture thereof. The soaps are generally prepared by saponifying fats or fatty acids with a metallic hydroxide or mixtures of hydroxides. The fats which may be employed in making the soaps may be of either animal or vegetable origin, such as mutton fat, lard oil, rape seed oil, cotton seed oil, castor oil, perilla oil, sun-flower seed oil, ground nut oil, and the like, or mixtures of two or more fats. If fatty acids are employed it is preferred that they contain twelve or more carbon atoms such as lauric, myristic, palmitic, margaric, stearic, nondecylic, carnobic, cerotic, montanic, oleic, behenic, linoleic and linolenic acids. Those acids which are saturated or contain not more than one unsaturated bond in the molecule are most highly preferred.

The lubricating oil

The lubricating oil with which the soap and the glycols defined hereinafter are combined may be of natural or synthetic origin. The temperature at which the grease becomes solid and loses its plasticity to the point of becoming rigid under low shearing stresses depends directly upon the fluidity of the oil it contains. Fluidity at low temperatures depends in turn on the pour point and viscosity of the oil. Below the pour point the oil ceases to be fluid and above the pour point the viscosity of the oil determines its fluidity. Accordingly, the particular oil employed in the grease of this invention preferably has a pour point below about —50° F. and has as low a viscosity as is consistent with proper lubricating power and stability of the grease. Too low a viscosity causes both loss of lubrication and separation of the oil from the soap.

Lubricating oils other than or in addition to mineral oils may be employed. These are usually polymeric or high molecular weight non-hydrocarbons, or synthetic hydrocarbons produced by polymerizing low molecular weight hydrocarbons. The non-mineral oil lubricants may be used to modify or replace mineral oils in the greases when special characteristics are desired.

The glycols

As stated hereinabove, the present invention comprises improving ordinary greases by the incorporation therein of glycols having six or more carbon atoms, and having the general formula

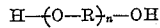

wherein $n$ is an integer, R is a hydrocarbon radical or a hydrocarbon radical containing hydroxy substituents, and the factor $n$ times the number of carbons in R is 6 or more. The glycols may be monomeric or polymeric.

Monomeric and polymeric polymethylene glycols which may be used to stabilize greases have the general formula

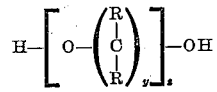

wherein $z$ is an integer, $y$ is an integer greater than 5 and the R's are substituents attached to the carbon atoms are hydrogen atoms or organic radicals. Preferably $z$ is an integer less than 10, and more preferably is an integer from 1 to 4. Actually, when $z$ is more than 1, the glycol is a dimer, trimer, etc., of the corresponding monomeric glycol. The polymethylene glycols polymerizing most readily are those in which $y$ is an integer from 6 to 20.

Monomeric, unsubstituted polymethylene glycols falling within the above formula include 1,6-hexanediol; 1,7-heptanediol; 1,8-octanediol; 1,9-nonanediol; 1,10-decanediol; 1,12-dodecanediol; and polymerizable homologs, analogs and derivatives of the same.

The above glycols are those in which all of the R substituents attached to the carbon atoms are hydrogen atoms. When R's other than hydrogen are used, they may be hydrocarbon radicals, such as aliphatic, aromatic, or alicyclic hydrocarbon radicals, or radicals containing non-hydrocarbon members, such as hydroxyl, carboxyl, or carbonyl groups, or sulfur, selenium, tellerium, phosphorus or nitrogen atoms. Preferably, however, any organic radicals attached to the polymethylene glycol are hydrocarbon radicals. Of these, the aliphatic hydrocarbons are preferred, and the saturated lower aliphatic radicals give the most stable polymers. Hence, the preferred R's other than hydrogen, are the lower alkyls, such as methyl, ethyl, propyl, iso-propyl, butyl, sec.-butyl, tert.-butyl, amyl, iso-amyl, hexyl, etc. groups. Again even when R's other than hydrogen are present, it is preferred that the monomeric glycol contain a preponderance of hydrogen substituent R's. The most reactive glycols are those in which less than 4 R's are other than hydrogen, and the greatest reactivity is possessed by those having 2 or less R's which are organic radicals.

Glycols which fall within the above classification include heptanediol-1,6; 1,6-octanediol; 1,6-nonanediol; 1,6-dodecanediol; 1,6-decanediol; 1,7-octanediol; 1,7-nonanediol; 1,7-decanediol; 1,7-dodecanediol; 1,8-nonanediol; 1,8-decanediol; 1,8-dodecanediol; 1,9-decanediol; 1,9-dodecanediol; 1,10-dodecanediol; 2,7-octanediol; 2,7-nonanediol; 2,7-decanediol; 2,7-dodecanediol; 2,8-nonanediol; 2,8-decanediol; 2,8-dodecanediol; 2,9-decanediol; 2,9-dodecanediol; 2,3-dimethyl-1,6-hexanediol; 2,4-dimethyl-1,6-hexanediol; 2,5-dimethyl-1,6-hexanediol; 4,4-dimethyl-1,6-hexanediol; 5,5-dimethyl-1,6-hexanediol; 2-methyl-3-ethyl-1,7-heptanediol; 2-ethyl-3-methyl-1,7-heptanediol; 3,3-diethyl-1,7-heptanediol; 3,4-diisopropyl-1,8-octanediol, etc., and their polymerizable homologs, analogs and derivatives.

Polymeric glycols having two carbon atoms separating the glycollic hydroxyls which act as grease stabilizers include polymers of 1,2-ethanediol; (ethylene glycol); 1,2-propanediol; 1,2-butanediol; 2,3-butanediol; 1,2-pentanediol; 2,3-pentanediol; 3,4 - pentanediol; 1,2 - hexanediol; 2,3-hexanediol; 3,4-hexanediol; 1,2-heptanediol; 2,3-heptanediol; 3,4-heptanediol; 4,5-heptanediol; 5,6-heptanediol; and their homologs, analogs and polymerizable derivatives. Polymers useful in carrying out the present invention include diethylene glycol, triethylene glycol, tetraethylene glycol, dipropylene glycol, tripropylene glycol, etc.

Polymeric glycols having three carbon atoms separating the glycollic hydroxyls which may be used as grease stabilizers are derived from 1,3-propanediol (trimethylene glycol) and have the general formula

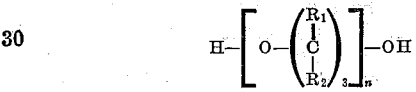

wherein n is an integer and $R_1$ and $R_2$ are hydrogen atoms or organic radicals, especially hydrocarbon radicals.

If $R_1$ and/or $R_2$ are not hydrogens, they may be organic radicals such as alkyl, aralkyl, aryl, etc. groups. Preferably, if they are not hydrogen atoms, they are aliphatic hydrocarbon radicals, especially saturated lower aliphatic radicals, but may also be groups which contain olefinic or acetylenic links. Typical of the polymeric trimethylene alkyl substituted glycols are the polymers of methylated trimethylene glycols, including 1-methyl-1,3-propanediol; 2-methyl-1,3-propanediol; 1,1-dimethyl-1,3-propanediol; 1,2-dimethyl - 1,3 - propanediol; 1,3 - dimethyl - 1,3-propanediol; 2,3-dimethyl-1,3-propanediol; 1,1,2-trimethyl - 1,3 - propanediol; 1,1,3 - trimethyl-1,3-propanediol; 1,2,2 - trimethyl - 1,3-propanediol; 1,2,3-trimethyl-1,3 - propanediol; 1,1,2,2 - tetramethyl-1,3-propanediol; 1,1,3,3-tetramethyl-1,3-propanediol; 1,2,3,3-tetramethyl-1,3-propanediol; 1,1,2,2,3-pentamethyl-1,3-propanediol; 1,1,2,3,3-pentamethyl-1,3-propanediol; and hexamethyl-1,3-propanediol.

In place of the methyl groups other alkyl groups may be utilized, such as ethyl, propyl, butyl, amyl, hexyl, heptyl, octyl, nonyl, decyl, etc., radicals, as well as their isomers. Preferably, when alkyl groups are the substituents $R_1$ and $R_2$, they have from 1 to 10 carbon atoms, and still more preferably from 1 to 5. It will be understood that $R_1$ and $R_2$ may be similar or dissimilar groups. Thus, when expanding the general formula given hereinbefore to its indicated number of carbon atoms, it then becomes

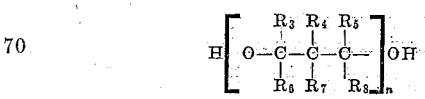

wherein $R_3$ through $R_8$ are either hydrogen atoms or similar or dissimilar organic radicals. Those derivatives of trimethylene glycol, other than trimethylene glycol itself, which give the most satisfactory polymers for general use have either one or two of the R's as lower alkyl groups. Thus, 2-methyl-1,3-propanediol; and 2,2-dimethyl-1,3-propanediol form excellent polymers for use in present invention.

Other lower alkyl substituted trimethylene glycol polymers which act as grease stabilizers are 1 - methyl - 2-ethyl-1,3-propanediol; 2-methyl-2-ethyl - 1,3 - propanediol; 1-methyl-3-ethyl-1,3-propanediol; 2-methyl-2-propyl-1,3-propanediol; 1-methyl-2-isopropyl-1,3-propanediol; 2-methyl-2-butyl-1,3-propanediol; 2-methyl-3-butyl-1,3-propanediol; and the homologs, analogs and derivatives of the same.

The polymeric alkylene oxides having hydroxyl groups on the terminal carbons of each polymer chain also acts as stabilizers in the compositions of the present invention. Suitable polymers, having six or more carbon atoms, are those of ethylene oxide, propylene oxide, isobutylene oxide, n-butylene oxide, etc. Other suitable polymers are those of allyl alcohol.

*Other ingredients*

It is sometimes desirable to add other materials for specific purposes, such as various oxidation inhibitors, extreme pressure agents, anti-corrosion agents etc.

The proportion of the various components in the greases of the present compositions may be within the following approximate limits:

| | Per cent |
|---|---|
| Lubricant | 30–70 |
| Soap | 10–60 |
| Glycol | 1–10 |
| Additives | 0–10 |

The greases may be prepared in various ways. For example, the preformed soap may be mixed with the lubricant and then with the glycol; all three components may be simultaneously mixed; the soaps may be formed in the presence of the lubricant, or the glycol, or both, etc.

The greases prepared according to the present invention have outstanding stability in comparison with prior art greases. The higher glycols, as specified hereinbefore not only create but also maintain the stability of the grease compositions.

The following examples illustrate methods of preparing the glycol-containing greases:

*Example I*

A mixture of 150 parts by weight of calcium palmitate, 850 parts by weight of mineral engine oil and 15 parts of cetene glycol is heated for 45 minutes at 160° C. with stirring. The suspension obtained is drained off in thin layers into grease cooling pans. After cooling to room temperature, the grease is homogenized by rolling and pressing.

*Example II*

A mixture of 200 parts by weight of palm oil fatty acids, 400 parts by weight of spindle oil, 20 parts by weight of dodecene glycol and 30 parts by weight of lime is saponified in an autoclave for 1 hour at 160° C. The product is transferred to an open vat and mixed with 400 parts by weight of mineral spindle oil.

I claim as my invention:

1. A grease composition comprising a major amount of a lubricating oil, a metallic soap in an amount sufficient to gel said oil and form a grease structure and from 1% to 10% of cetene glycol.

2. A grease composition comprising a major amount of a lubricating oil, a metallic soap in an amount sufficient to gel said oil and form a grease structure and from 1% to 10% of dodecene glycol.

3. A grease composition comprising a major amount of a lubricating oil, a calcium soap in an amount sufficient to gel said oil and form a grease structure and a substantially oil soluble monomeric glycol having at least 6 carbon atoms in an amount ranging from 1% to 10%.

4. A grease composition comprising a mineral oil lubricant, a metallic soap in an amount sufficient to gel said oil and form a grease structure and a substantially oil soluble monomeric glycol having at least 6 carbon atoms in an amount ranging from 1% to 10%.

5. A grease composition comprising a major amount of a lubricating oil, an alkaline earth metal soap in an amount sufficient to gel said oil and form a grease structure and a substantially oil soluble monomeric glycol having at least 6 carbon atoms in an amount ranging from 1% to 10%.

6. A grease composition comprising a major amount of a lubricating oil, an alkali metal soap in an amount sufficient to gel said oil and form a grease structure and a substantially oil soluble monomeric glycol having at least 6 carbon atoms in an amount ranging from 1% to 10%.

7. A grease composition comprising a major amount of a lubricating oil, a metallic soap in an amount sufficient to gel said oil and form a grease structure and a substantially oil soluble glycol having the general formula HO—R—OH wherein R is a hydrocarbon radical having at least 6 carbon atoms in an amount ranging from 1% to 10%.

8. A grease composition comprising a major amount of a lubricating oil, a metallic soap in an amount sufficient to gel said oil and form a grease structure and a substantially oil soluble monomeric glycol having at least 12 carbon atoms in an amount ranging from 1% to 10%.

9. A grease composition comprising a major amount of a lubricating oil, a metallic soap in an amount sufficient to gel said oil and form a grease structure and a substantially oil soluble monomeric glycol having from 12 to 20 carbon atoms in an amount ranging from 1% to 10%.

10. A grease composition comprising a major amount of a lubricating oil, a calcium soap in an amount sufficient to form a grease structure and from 1% to 10% of cetene glycol.

11. A grease composition comprising a major amount of a lubricating oil, a metallic soap of a fatty acid having at least 12 carbon atoms in an amount sufficient to gel and form a grease structure and a substantially oil-soluble monomeric glycol having at least 6 carbon atoms in an amount ranging from 1% to 10%.

12. A grease composition comprising a major amount of a lubricating oil, an alkaline earth metal soap of a fatty acid having at least 12 carbon atoms in an amount sufficient to gel and form a grease structure and a substantially oil-soluble monomeric glycol having at least 6 carbon atoms in an amount ranging from 1% to 10%.

13. A grease composition comprising a major amount of a lubricating oil, a calcium soap of a fatty acid having at least 12 carbon atoms in an amount sufficient to gel and form a grease structure and a substantially oil-soluble monomeric glycol having at least 6 carbon atoms in an amount ranging from 1% to 10%.

HENDRIK van OLPHEN.

REFERENCES CITED

The following references are of record in the file of this patent:

UNITED STATES PATENTS

| Number | Name | Date |
|---|---|---|
| 1,982,662 | Hodson | Dec. 4, 1934 |
| 2,108,643 | Brunstrum et al. | Feb. 15, 1938 |
| 2,122,940 | Hodson | July 5, 1938 |
| 2,361,806 | Merrill | Oct. 31, 1944 |
| 2,433,861 | McNulty et al. | Jan. 6, 1948 |
| 2,436,347 | Zimmer et al. | Feb. 17, 1948 |

FOREIGN PATENTS

| Number | Country | Date |
|---|---|---|
| 340,294 | Great Britain | Feb. 18, 1930 |
| 683,359 | France | Feb. 25, 1930 |

OTHER REFERENCES

Chemical and Engineering News, Nov. 25, 1944, 2 pages—Advertisement of Commercial Solvents Corporation entitled "2-2-4."